Dec. 30, 1969   W. C. ROGERS   3,487,463
MARKER BEACON ANTENNA
Filed March 25, 1968

INVENTOR.
WILLIAM C. ROGERS
BY
Burns, Doane, Benedict, Swecker & Mathis
ATTORNEYS

United States Patent Office 3,487,463
Patented Dec. 30, 1969

3,487,463
MARKER BEACON ANTENNA
William C. Rogers, 5365 NW. 36th St.,
Miami Springs, Fla. 33166
Filed Mar. 25, 1968, Ser. No. 715,813
Int. Cl. H01q 1/28
U.S. Cl. 343—708                                             11 Claims

ABSTRACT OF THE DISCLOSURE

A nonrotatable loop type aircraft antenna encased in an aerodynamic drag reducing housing and having a reactance element at the outer extremity thereof. The reactance element is variable to compensate the antenna for the size and shape of the aircraft on which it is installed.

BACKGROUND OF THE INVENTION

The use of marker beacon antennas on aircraft is today widespread. As is well known, the effective length of an antenna controls the range of frequencies to which the antenna is responsive. The current practice of the antenna manufacturing industry is to produce an antenna of a fixed physical size and to modify the effective length thereof by means of a variable reactance element in the antenna circuit. A continued problem in the installation of such dimensionally fixed antennas on aircraft which differ widely both in size and configuration has been the effective tuning of the antenna since the aircraft itself is connected into the antenna circuit.

As stated, a prior art approach to this problem has been the inclusion of a variable reactance element in the antenna circuit. One such prior art approach has been the tuning of the antenna by the axial positioning of a tuning slug of magnetic material within an inductance coil connected in the antenna circuit. The tuning of the antenna by varying the reactance of such a reactance element has, however, been a laborious one. The antenna must necessarily be installed on the aircraft so that the aircraft becomes part of the antenna circuit. The frequency response of the antenna must then be tested and then the antenna removed from the aircraft to adjust the reactance of the tuning element. The antenna must then be reinstalled and retested and again removed for adjustment until the desired tuning of the antenna is accomplished.

In the mechanically less hostile environment of the related field of vehicular antennas, the burden of removing the antenna from the automobile or other conveyance for adjustment of the axial position of the tuning slug within the coil has been eased by the installation of the variable reactance coil in the base portion of the mounting assembly of a rod type antenna and positioning the tuning slug by rotation of the entire antenna. Such a system is disclosed in U.S. Patent 3,264,647, to A. C. Nuttle.

It is a primary object of the present invention to provide a novel antenna which may be permanently installed on an aircraft and then easily tuned in place to compensate for the size and shape of the particular aircraft on which the antenna is installed.

Another object of the present invention is to provide a novel tunable aircraft antenna in which the resonant frequency thereof may be varied without the rotation of the antenna or its removal from the aircraft.

A further object of the present invention is to provide a novel tunable antenna in which the moisture from the atmosphere is prevented by the wind stream from accumulating on the antenna mounting by the construction of the antenna and the provision of the variable reactance element on the outer and rearward extremity thereof.

Yet another object of the present invention is to provide a novel aircraft antenna having reduced aerodynamic drag which may be easily tuned without the use of special tools and with the antenna installed on the aircraft.

These and other objects and advantages of the present invention may be more easily ascertained from the claims and the following detailed description when read in conjunction with the appended drawings.

THE DRAWINGS

THE PREFERRED EMBODIMENT

Figure 1:
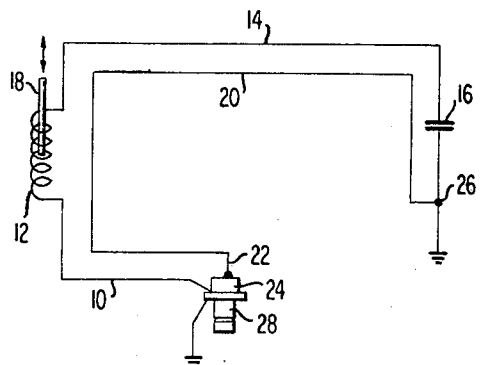
FIGURE 1 is a schematic diagram of the electrical circuit of the antenna of the present invention.

Referring now to the schematic diagram of FIGURE 1, the antenna circuit comprises a rod 10, an inductive reactance element or coil 12, a rod 14, and a capacitive reactance element 16; the circuit being completed through the skin of the aircraft by conventional grounding, schematically shown. Rods 10 and 14 comprise the actual wave energy detecting elements and may be made, for example, of No. 12 solid, tinned copper bus bar. A coil of eight turns of No. 26 enameled wire has been found suitable as the coil 12.

The inductive reactance of coil 12 may be varied in a well known manner by the selective positioning of an elongated core 18 of magnetic material with respect thereto. Varying the inductance of coil 12 varies the effective length of the antenna and thus the frequency range of the wave energy to which the antenna will respond.

The energy detected by the antenna as thus far described is coupled to a remote receiver (not shown) by means of a coupling loop 20 connected at one end 22 to the center conductor of a coaxial connector 24 and at the other end 26 to the skin of the aircraft which is electrically connected to the outer conductor 28 of the coaxial connector 24.

Figure 3:
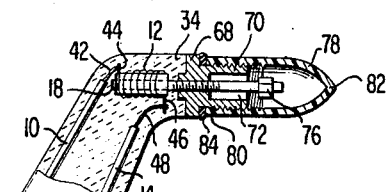
FIGURE 3 is a section taken through lines 3—3 of FIGURE 2.
Figure 3:
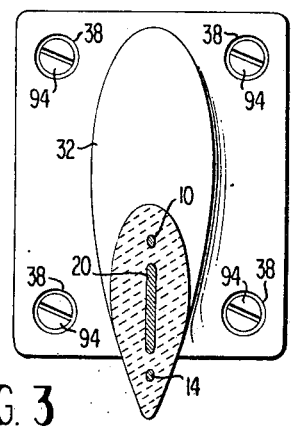
Figure 2:
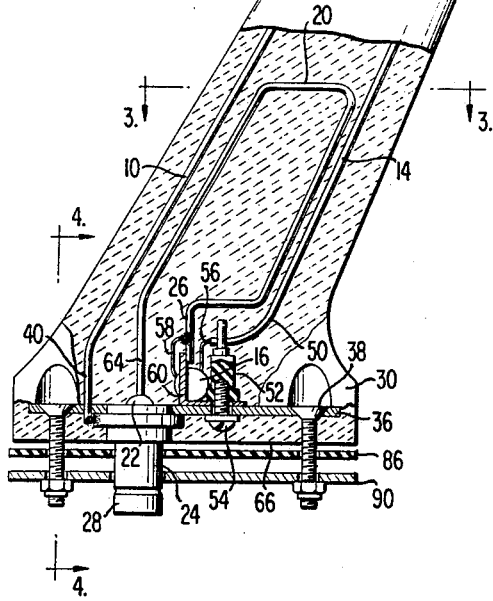
FIGURE 2 is a side view of the antenna of the present invention in which the dielectric airfoil configured housing has been partially cut away to expose the internal portions of the antenna.
Figure 4:
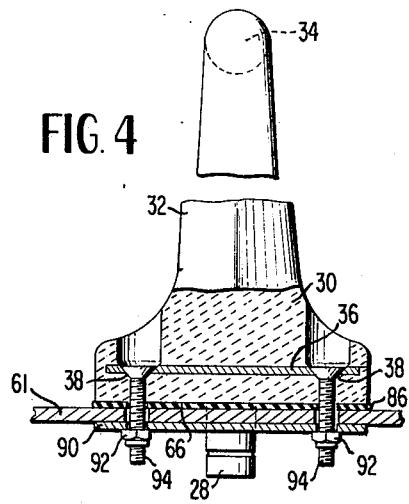
FIGURE 4 is a fragmented section taken through lines 4—4 of FIGURE 2.

The physical construction of the antenna may be seen more clearly with reference to FIGURES 2, 3, and 4. As shown in these figures, the antenna is physically comprised generally of a base portion 30, upstanding body portion 32, and an elongated upper portion 34.

As shown in FIGURES 2 and 4, the base portion 30 includes a generally rectangular flat metallic base plate 36 which is provided with a frustoconical aperture 38 in each corner thereof to facilitate attachment of the antenna to the skin of the aircraft in a manner to be hereinafter described.

With continued reference to FIGURE 2, the antenna as stated comprises a rod 10, a variable inductance coil 12 a rod 14, and a capacitor 16. The lower end 40 of rod 10 is attached to the base plate 36 and to the outer conductor 28 of the coaxial connector 24 in a conventional manner such as by soldering. The electrical connection between the upper end 42 of the rod 10 and end 44 of coil 12 may likewise be assured by soldering as may the electrical connection between the end 46 of the coil 12 and the upper end 48 of the rod 14.

The lower end 50 of rod 14 is supported out of electrical contact with the skin of the aircraft by means of an insulated support member 52 which may be threadably attached to the base plate 36 by means of a screw 54. End 50 of rod 14 may also be soldered to one lead 56 of capacitor 16 to establish a firm electrical connection thereto.

The other lead 58 of capacitor 16 is electrically connected to the end 26 of the coupling loop 20 and to the electrically conductive, upstanding portion of an L-shaped metallic support member 60. The generally horizontal portion of the support member 60 is sandwiched between the insulated support member 52 and the base plate 36 and is apertured to receive the screw 54. A firm mechanical and electrical contact with the skin of the aircraft is thus established through the base plate 36 as will be described.

The other end 64 of the coupling loop 20 is electrically connected to the center conductor 22 of the coaxial connector 24 and the entire antenna as thus far described encased in a ceramic, epoxy, or other dielectric material which provides rigid support and protection from the elements. The external shape of the antenna is molded to conform at the bottom surface 66 of the base portion 30 to the skin 61 of the aircraft as shown in FIGURE 4. The upstanding body portion 32 is molded to an airfoil cross section as illustrated in FIGURE 3 to aerodynamically reduce drag. The body portion 32 of the antenna tapers in cross section in a direction normal to and away from the skin 61 of the aircraft as may be seen in FIGURE 2. The axis of the body portion 32 is slanted upwardly and rearwardly in a conventional manner to further reduce the aerodynamic drag which results from its protrudance into the wind stream.

Referring to FIGURES 2 and 4, the upper portion 34 of the antenna is elongated rearwardly along the direction of anticipated fluid stream and terminates in a centrally apertured cap 68. Cap 68 has a reduced diameter, externally threaded, cylindrical portion 70 extending rearwardly therefrom coaxially about the central aperture 72. The aperture 72 is internally threaded throughout the thickness of cap 68 to cooperatively receive the external threads of an elongated core or tuning slug 18 of magnetic material.

The internal diameter of the rearwardly extending cylindrical portion 70 of cap 68 is larger than the outside diameter of the tuning slug 18 which extends in a forward direction through the aperture 72 of the cap 68 into the coil 12 along the longitudinal axis thereof. The tuning slug 18 may be configured at its extreme rearward end 76 of a number of flats to facilitate engagement by a suitable work tool for rotation and thus the axial positioning of the tuning slug 18 with respect to the coil 12.

An internally threaded hollow molded shield element 78 is threaded onto the externally threaded rearwardly extending cylindrical portion 70 of the cap 68. The shield 78 is configured at its forward end 80 to conform to the cylindrical external shape of the upper portion 34 of the antenna. The diameter of the rearward end 82 of the shield 78 is, however, gradually reduced to terminate in a point. A suitable annular sealing ring 84 is provided between the forward end 80 of the shield 78 and the cap 68.

The method of installing the antenna of the present invention onto the skin of the aircraft may more easily be seen with reference to FIGURES 2 and 4. A suitably apertured sealing gasket 86 is positioned between the bottom surface 66 of the base portion 30 of the antenna and the metallic skin 61 of the aircraft. A suitably apertured backing plate 90 is then positioned on the under side of the skin 61 of the aircraft in alignment with the mounting apertures. The backing plate 90 and the sealing gasket 86 are centrally apertured to receive the coaxial connector 24 and the skin 61 of the aircraft must, of course, also be so provided with an aligned aperture. The backing plate 90 has an internally threaded nut 92 secured in a conventional manner, as by welding, in an overlying relation to each of the apertures 38 in the corners of the base plate 36 and the base portion 30 of the antenna.

As shown in FIGURE 4, the threadable insertion of four bolts 94 downwardly through the base portion 30 of the antenna, the sealing gasket 86, the skin of the aircraft, and the backing plate 90 into engagement with the nuts 92 provides a strong mechanical and electrical connection between the base plate 36 and the skin 61 of the aircraft. This connection is accomplished between of the aircraft. This connection is accomplished by means of the abutment of the bolts 94 with the base plate 36 and the nuts 92 threadably secured to the bolts 94 with the backing plate 90 in direct contact with the skin 61 of the aircraft.

ADVANTAGES

Varying the position of the tuning slug 18 with respect to the coil 12 changes the inductance of the coil 12. Since the reactance of the capacitor 16 is a predetermined, fixed value, any change in the inductive reactance of the coil 12 changes the effective length of the antenna and may be used to effectively compensate for the size and shape of the particular aircraft on which the antenna is installed.

Positioning the tuning element of the antenna in a spaced relation with respect to the aircraft greatly facilitates tuning of the installed antenna by providing sufficient space for the rotation of a suitable work tool.

Moreover, the shield 78 prevents the possible accumulation of moisture from the atmosphere which might short out some of the turns of the coil 12 and detune the antenna. Inadvertent rotation of the tuning slug 74 by the airstream or personnel servicing the aircraft is also thus prevented. In addition, the external shape of the shield 78 facilitates the dissipation of moisture from the antenna by the wind stream. The point 82 of the shield 78 also encourages the accumulation at a point rearwardly removed from the antenna of any static electricity which the antenna may tend to collect from dust or water particles in the atmosphere.

The physical configuration of the antenna of the present invention tends to minimize the problems of aerodynamic drag which exist at the air speed at which modern high performance aircraft operate. The encasement of both the antenna and the coupling loop 20 within the airfoil cross section ceramic housing contributes greatly to the reduced drag characteristics.

The need for rotation of the antenna has been eliminated. This represents a significant departure from the teaching of the prior art as represented by the previously mentioned patent to A. C. Nuttle. The rotation of an airfoil shaped antenna would clearly result in the creation of increased aerodynamic drag problems at all rotative positions other than the position in which the airfoil axis is aligned with the direction of the wind stream. Encasement of the conventional loop type antenna in a cylindrical housing has been found to be unsatisfactory due to the materially increased aerodynamic drag of the antenna as a result of the necessarily larger diameter of a housing which can accommodate the loop of the wave energy receiving element.

Moreover, the difficulties in providing a mechanically secure and electrically strong rotative connection have been eliminated. Further, the problem of sealing the interior of a rotating antenna from moisture from the atmosphere which may not only electrically short out one or more turns of the variable reactance element, but which may electrically remove the antenna from the receiver circuit, has been avoided. There is no tendency for moisture from the atmosphere to collect above or in front of the seals of the antenna of the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A tunable antenna adapted to be supported in an upstanding position on an exposed aircraft surface comprising:
 a nonconductive airfoil having a body portion, an upper portion, and a base adapted to be mounted on and electrically connected to the skin of the aircraft by means of the outer conductor of a coaxial connector;
 said body portion extending slantingly upward from said base and having an airfoil cross section tapering away from said base;
 an elongated electrically conducting element disposed within said body portion and terminating at one end in the center conductor of said coaxial connector and at the other end in said base;
 said upper portion being elongated along the axis of the aircraft and having a variable electrical reactance element disposed therein, said reactance element being electrically connected to said electrically conducting element; and
 means rotatable externally of said upper portion for selectively varying the electrical reactance of said reactance element to thereby tune the antenna without dismounting the antenna from the aircraft.

2. The antenna of claim 1 wherein said upper portion is elongated rearwardly from said body portion and including a shield member for said means adapted to be removably attached to the rearward end of said upper portion.

3. The antenna of claim 1 wherein said reactance element includes a torodial coil and wherein said means includes a core of magnetic material selectively advanced through said upper portion into said coil to vary the reactance thereof.

4. The antenna of claim 2 wherein said reactance element includes a torodial coil and wherein said means includes a core of magnetic material selectively advanced through said upper portion into said coil to vary the reactance thereof.

5. The method of tuning an antenna installed on an aircraft comprising the steps of:
 providing an antenna having a base and a body portion having an elongated antenna element housed therein;
 nonrotatably installing the antenna on an aircraft;
 providing a variable reactance element in the body portion of the antenna electrically connected to the elongated antenna element;
 providing means externally carried by the body portion for varying the reactance of the reactance element within the body portion; and
 selectively varying the reactance of the reactance element to thereby tune the installed antenna.

6. In combination:
 an aircraft;
 an antenna externally mounted on said aircraft; and
 means electrically connected to said antenna for tuning said antenna, said means being spaced from said aircraft and at least a portion of said antenna being between said aircraft and said tuning means.

7. The combination of claim 6 including an airfoil shaped housing for said antenna and wherein said tuning means is supported by said housing.

8. The combination of claim 7 wherein said tuning means includes a coil supported internally of said housing and means protruding from said housing for varying the inductance of said coil.

9. The combination of claim 8 including a hollow shield for said inductance varying means, said shield being supported by said housing and having an axis substantially conforming to the axis of said aircraft.

10. An aircraft antenna comprising:
 a receiving element having an elongated loop configuration;
 a coupling element having an elongated loop configuration and disposed coplanar with said receiving element;
 a variable reactance tuning element electrically connected to said receiving element; and
 a dielectric housing having an airfoil outer configuration elongated in the direction of aircraft travel, said receiving and said coupling elements and said timing element being disposed in said housing substantially along said direction of elongation.

11. The antenna of claim 10 wherein said tuning element includes means extending through said housing in the direction opposite to aircraft travel for varying the reactance of said tuning element and including a dielectric shield carried by said housing, said shield isolating said means from the airstream.

References Cited

UNITED STATES PATENTS

| | | | |
|---|---|---|---|
| 2,279,130 | 4/1942 | Bruce | 343—745 X |
| 2,834,961 | 5/1958 | Lear et al. | 343—705 X |
| 3,193,829 | 7/1965 | Braun et al. | 343—708 |
| 3,220,006 | 11/1965 | Young et al. | 343—708 |

HERMAN KARL SAALBACH, Primary Examiner

S. CHATMON, JR., Assistant Examiner

U.S. Cl. X.R
343—744, 745